(12) United States Patent
Rosenberg et al.

(10) Patent No.: US 11,718,262 B2
(45) Date of Patent: Aug. 8, 2023

(54) KNEE AIRBAG CONFIGURATION (71) Applicant: Volvo Car Corporation, Gothenburg (SE)

(72) Inventors: Johan Rosenberg, Lerum (SE); Sebastian Rutelin, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 17 days.

(21) Appl. No.: 16/829,289

(22) Filed: Mar. 25, 2020

(65) Prior Publication Data

US 2021/0300287 A1　　Sep. 30, 2021

(51) Int. Cl.
*B60R 21/206*　　(2011.01)
*B60R 21/215*　　(2011.01)
*B60R 21/231*　　(2011.01)
*B60R 21/00*　　(2006.01)

(52) U.S. Cl.
CPC .......... *B60R 21/215* (2013.01); *B60R 21/206* (2013.01); *B60R 21/231* (2013.01); *B60R 2021/0051* (2013.01); *B60R 2021/21518* (2013.01); *B60R 2021/23169* (2013.01)

(58) Field of Classification Search
CPC .......... B60R 21/206; B60R 2021/0051; B60R 2021/23169
See application file for complete search history.

(56) References Cited

U.S. PATENT DOCUMENTS

| | | | |
|---|---|---|---|
| 5,476,283 A | 12/1995 | Elton | |
| 6,471,242 B2 | 10/2002 | Schneider | |
| 7,600,776 B2 | 10/2009 | Hoshino et al. | |
| 8,231,140 B2 | 7/2012 | Maripudi et al. | |
| 9,365,182 B2 | 6/2016 | Tanaka et al. | |
| 9,457,760 B1 | 10/2016 | Raines et al. | |
| 9,758,121 B2 | 9/2017 | Paxton et al. | |
| 2004/0113399 A1* | 6/2004 | Yoshikawa | B60R 21/206 280/730.1 |
| 2005/0062264 A1 | 3/2005 | Arwood et al. | |
| 2006/0284400 A1* | 12/2006 | Sakakibara | B60R 21/2155 280/728.2 |
| 2015/0061268 A1* | 3/2015 | Nagasawa | B60R 21/231 280/730.1 |
| 2016/0096500 A1* | 4/2016 | Lannen | B60R 21/216 280/728.2 |
| 2020/0062211 A1* | 2/2020 | Deng | B60R 21/216 |

FOREIGN PATENT DOCUMENTS

| | | | | |
|---|---|---|---|---|
| DE | 102010007677 A1 * | 8/2011 | ........... | B60R 21/206 |
| DE | 102010035089 A1 * | 2/2012 | ........... | B60R 21/231 |

* cited by examiner

*Primary Examiner* — Keith J Frisby
(74) *Attorney, Agent, or Firm* — Clements Bernard Walker; Christopher L. Bernard (57) ABSTRACT

An airbag system for restraining a lower body of a vehicle occupant during a collision event and a method for deploying the same are disclosed. The airbag system includes a panel and a restraining airbag. The panel defines a support surface that is adapted to be deployed from a first configuration to a second configuration responsive to the collision event. In the first configuration, the panel forms part of an instrument panel of a vehicle and, in the second configuration, the panel is at least partially separated from the instrument panel of the vehicle. The restraining airbag is adapted to be deployed adjacent to the support surface of the panel between the support surface and the lower body of the vehicle occupant responsive to the collision event.

16 Claims, 6 Drawing Sheets

KNEE AIRBAG CONFIGURATION

TECHNICAL FIELD

The present disclosure is generally directed to the automotive and vehicle safety fields. More particularly, the present disclosure relates to techniques for deploying vehicle airbag systems for restraining a lower body of a vehicle occupant during a collision event.

BACKGROUND

In the automotive industry, early restraining of the lower body of a vehicle occupant during a collision event is vital for the protection and safety of the vehicle occupant, and in particular, when the vehicle occupant is not properly wearing a seat belt. Indeed, in order to meet the general vehicle occupant restraint requirements in some jurisdictions, early restraining of the lower body of the vehicle occupant during a collision event is necessary or highly desirable.

In conventional instrument panels, a portion of the instrument panel, such as a knee bolster or the glove box, is sufficiently close to the lower body of the vehicle occupant, and in particular, sufficiently close to the knees and legs of the vehicle occupant, to provide a restraining surface for the lower body of the vehicle occupant during a collision event. If sufficient support or restraining surfaces of the instrument panel of the vehicle are positioned further from the lower body of the vehicle occupant and are thus insufficient for the early restraining of the lower body of the vehicle occupant during a collision event, the early restraining of the lower body of the vehicle occupant is often achieved by deploying an airbag towards the lower body of the vehicle occupant during the collision event. A typical airbag system may include a detector mechanism for detecting when a vehicle experiences a collision event, such as a front-end collision, for example. Once a collision event is detected, the typical airbag system will deploy at least one or more airbags to protect the vehicle occupants.

If the airbag system determines that a passenger is seated in the front passenger seat, for example, one or more passenger-side airbags is deployed during the collision event to protect the passenger from forceful contact with the instrument panel and the windshield, and in particular, an airbag may deploy to prevent forceful contact between the lower body of the passenger and the instrument panel during the collision event. A similar airbag can be deployed for early restraining of the lower body of the operator of the vehicle during the collision event.

A current trend in interior styling in vehicles is to create more space for the vehicle occupants, especially in autonomous vehicles, for example. As part of this trend in interior styling, the contours of the instrument panel are being changed to create more space for the vehicle occupants. In particular, the profile of the lower portions of the instrument panel is being reduced to provide more room for the lower body of the vehicle occupants, especially under the instrument panel. However, as the profile of the lower portions of the instrument panel is reduced and positioned further from the lower body of the vehicle occupant, restraining performance within the vehicle for restraint of the lower body of the vehicle occupants is reduced.

The above-described background relating to the early restraining of the lower body of a vehicle occupant during a collision event is merely intended to provide a contextual overview of some current issues and is not intended to be exhaustive. Other contextual information may become apparent to those of ordinary skill in the art upon review of the following description of exemplary embodiments.

SUMMARY

The present disclosure generally provides an airbag system for restraining a lower body of a vehicle occupant during a collision event. In particular, a support surface is created by moving one or more parts of the instrument panel and holding the support surface in place, and a restraining airbag is deployed between the support surface and the lower body of the vehicle occupant. In this regard, the support surface acts as a rigid bolster for the restraining airbag, minimizing its effective deployment distance and imparting it with the desired structural integrity. The deployed restraining airbag, being supported from behind by the instrument panel at the support surface, is thus properly situated and adequately supported for early restraining of the lower body of the vehicle occupant during the collision event. Further, by providing support for the restraining airbag from one or more parts of the instrument panel, the total cushion size of the restraining airbag and the size of the inflators can be limited, thus avoiding excessively sized airbags and inflators.

In one exemplary embodiment, the present disclosure provides an airbag system for restraining a lower body of a vehicle occupant during a collision event. The airbag system includes a panel and a restraining airbag. The panel defines a support surface that is adapted to be deployed from a first configuration to a second configuration responsive to the collision event. In the first configuration, the panel forms part of an instrument panel of a vehicle and, in the second configuration, the panel is at least partially separated from the instrument panel of the vehicle. The restraining airbag is adapted to be deployed adjacent to the support surface of the panel between the support surface and the lower body of the vehicle occupant responsive to the collision event.

In one embodiment of the airbag system, the panel is adapted to be deployed from the first configuration to the second configuration one of before and simultaneous with the restraining airbag being deployed adjacent to the support surface of the panel between the support surface and the lower body of the vehicle occupant. In another embodiment of the airbag system, the panel is pivotably coupled to the instrument panel of the vehicle and adapted to be pivoted from the first configuration to the second configuration. In a further embodiment of the airbag system, the airbag system further includes a supporting airbag adapted to be deployed between the instrument panel of the vehicle and the panel opposite the support surface to deploy the panel from the first configuration to the second configuration. Optionally, the restraining airbag and the supporting airbag form different chambers of a common airbag. In a still further embodiment of the airbag system, the airbag system includes a locking mechanism coupled to the panel and at least one of the instrument panel of the vehicle and a frame of the vehicle, the locking mechanism adapted to secure the panel in the second configuration once deployed.

In another exemplary embodiment, the present disclosure provides an instrument panel for a vehicle. The instrument panel includes a panel and a restraining airbag. The panel defines a support surface that is adapted to be deployed from a first configuration to a second configuration responsive to a collision event. In the first configuration, the panel forms part of the instrument panel of the vehicle and, in the second configuration, the panel is at least partially separated from the instrument panel of the vehicle. The restraining airbag is adapted to be deployed adjacent to the support surface of the panel between the support surface and a lower body of a vehicle occupant responsive to the collision event.

In one embodiment of the instrument panel, the panel is adapted to be deployed from the first configuration to the second configuration one of before and simultaneous with the restraining airbag being deployed adjacent to the support surface of the panel between the support surface and the lower body of the vehicle occupant. In another embodiment of the instrument panel, the panel is pivotably coupled to one or more components of the instrument panel and adapted to be pivoted from the first configuration to the second configuration. In a further embodiment of the instrument panel, the instrument panel further includes a supporting airbag adapted to be deployed between a surface of the instrument panel of the vehicle and the panel opposite the support surface to deploy the panel from the first configuration to the second configuration. Optionally, wherein the restraining airbag and the supporting airbag form different chambers of a common airbag. In a still further embodiment of the instrument panel, the instrument panel further includes a locking mechanism coupled to the panel and at least one of the instrument panel of the vehicle and a frame of the vehicle, the locking mechanism adapted to secure the panel in the second configuration once deployed.

In a further exemplary embodiment, the present disclosure provides a method for deploying an airbag system for restraining a lower body of a vehicle occupant during a collision event. The method includes deploying a panel defining a support surface of a panel from a first configuration to a second configuration responsive to the collision event. In the first configuration, the panel forms part of an instrument panel of a vehicle and, in the second configuration, the panel is at least partially separated from the instrument panel of the vehicle. The method also includes deploying a restraining airbag adjacent to the support surface of the panel between the support surface and the lower body of the vehicle occupant responsive to the collision event.

In one embodiment of the method, the panel is deployed from the first configuration to the second configuration one of before and simultaneous with the restraining airbag being deployed adjacent to the support surface of the panel between the support surface and the lower body of the vehicle occupant. In another embodiment of the method, the method includes at least one of: deploying a supporting airbag between the instrument panel of the vehicle and the panel opposite the support surface to deploy the panel from the first configuration to the second configuration; and actuating the panel to deploy the panel from the first configuration to the second configuration using a mechanical actuator coupled to the panel and at least one of a component of the instrument panel of the vehicle and a frame of the vehicle. Optionally, the restraining airbag and the supporting airbag form different chambers of a common airbag. In a further embodiment of the method, the method also includes securing the panel in the second configuration once deployed via a locking mechanism coupled to the panel and at least one of the instrument panel of the vehicle and a frame of the vehicle.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EXEMPLARY EMBODIMENTS

In various embodiments, the present disclosure relates to an airbag system for restraining a lower body of a vehicle occupant during a collision event and a method for deployment thereof. Again, a support surface is created by moving one or more parts of the instrument panel and holding the support surface in place, and a restraining airbag is deployed between the support surface and a lower body of the vehicle occupant.

The deployed restraining airbag, being supported from behind by the one or more instrument panels at the support surface, is thus situated for early restraining of the lower body of the vehicle occupant during the collision event. Since the restraining airbag is supported from behind at the support surface, the restraining airbag is supported by a stiff surface at a location closer to the lower body of the vehicle occupant. Thus, the restraining airbag is more compact and requires a smaller cushion size and smaller inflators. Further, any complexities resulting from the use of larger cushion sizes and inflators is thus avoided.

Figure 1:
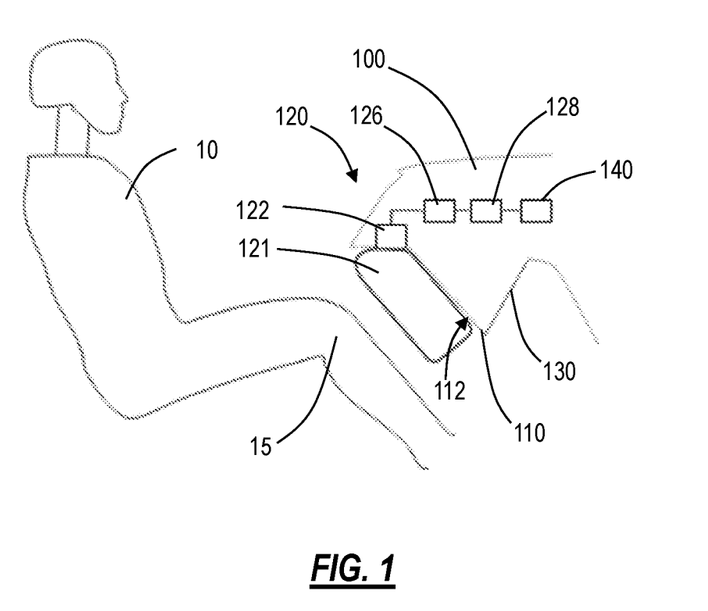
FIG. 1 is a schematic diagram illustrating a side view of an interior portion of a vehicle including an instrument panel and an airbag system for restraining a lower body of a vehicle occupant during a collision event, according to various embodiments of the present disclosure.

FIG. 1 is a schematic diagram illustrating a side view of an interior portion of a vehicle including an instrument panel 100 and an airbag system 120 for restraining a lower body 15 of a vehicle occupant 10 during a collision event, according to various embodiments of the present disclosure. The vehicle includes an instrument panel 100. The instrument panel 100 includes a dashboard, vehicle instruments, and a glovebox, among other things.

The vehicle also includes the airbag system 120. In embodiments, the airbag system 120 is part of the instrument panel 100. The airbag system 120 includes a panel 110 and a restraining airbag 121. As can be seen in FIG. 1, during a collision event the panel 110 deploys from the instrument panel 100 and provides a support surface 112, and the restraining airbag 121 deploys from the instrument panel 100, adjacent to the support surface 112, and adjacent to the lower body of the vehicle occupant 15 during the collision event to restrain the lower body of the vehicle occupant 15. In the embodiment shown, the restraining airbag 121 deploys in a downward trajectory from the instrument panel 100. It should be noted that the panel 110 and support surface 112 could be rigid, semi-rigid, or exhibit a degree of flexibility, provided that an adequate support mechanism is provided thereby.

In embodiments, the airbag system 120 also includes a restraining airbag storage module 122, a collision detector 140, one or more ignitors/inflators 126, and a microprocessor 128. The restraining airbag storage module 122 is positioned within the instrument panel 100 adjacent to the panel 110 and holds the restraining airbag 121 in an uninflated state prior to deployment of the restraining airbag 121. The collision detector 140 is configured to detect a collision event. The one or more ignitors/inflators 126 are adapted to inflate the airbags of the airbag system 120, including the restraining airbag 121, to a predetermined pressure. The microprocessor 128 is configured to initiate deployment of the airbag system 120, based on instructions stored in a memory, when a collision event is detected by the collision detector 140. In particular, the microprocessor 128 causes the panel to deploy and causes the one or more ignitors/inflators 126 to inflate the restraining airbag 121, such as by sending a command signal to an actuator for the panel 110 and a command signal to the one or more ignitors/inflators 126.

The instrument panel 100 also includes a panel support 130 that is adapted to hold the panel 110 in position to support the restraining airbag 121 during the collision event. Embodiments of the panel support 130 are described in further detail below.

Figure 2:
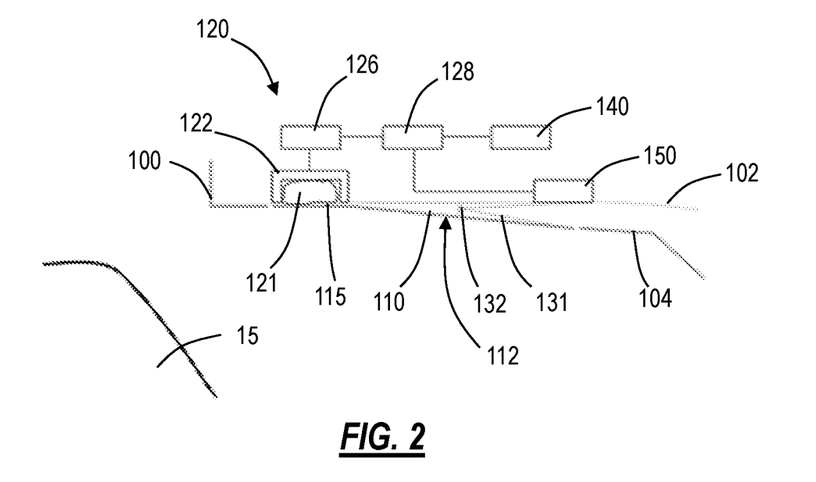
FIG. 2 is a schematic diagram illustrating a side view of a portion of the instrument panel of a vehicle including an airbag system for restraining a lower body of a vehicle occupant in a first configuration prior to a collision event, according to various embodiments of the present disclosure.

In embodiments, the instrument panel 100 also includes a cover panel 115 (see FIG. 2). The cover panel 115 also forms part of the instrument panel 100 prior to the collision event and is positioned adjacent to panel 110 and adjacent to the restraining airbag storage module 122, such as under the restraining airbag storage module 122. During deployment of the restraining airbag 121, the cover panel 115 pivots away from the vehicle occupant towards the panel 110, which allows the restraining airbag 121 to deploy downward and into the second configuration. It should be noted that panel 110 and cover panel 115 could be separate components or different portions of the same, integrated component.

Figure 3:
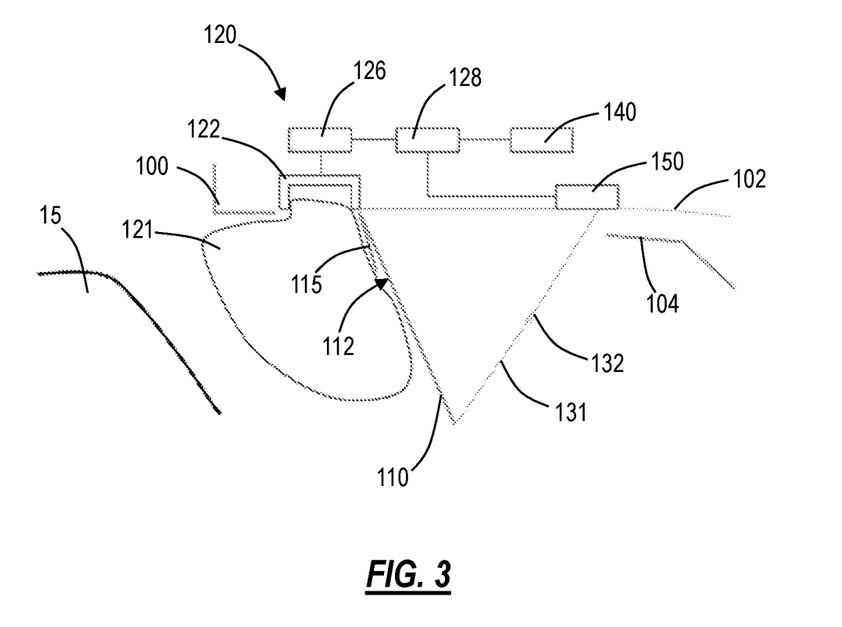
FIG. 3 is a schematic diagram illustrating a side view of a portion of the instrument panel of a vehicle including an airbag system of FIG. 2 for restraining a lower body of a vehicle occupant in a second configuration during a collision event, according to various embodiments of the present disclosure.

FIG. 2 is a schematic diagram illustrating a side view of a portion of the instrument panel 100 of a vehicle including an airbag system 120 for restraining a lower body of a vehicle occupant 15 in a first configuration prior to a collision event, according to various embodiments of the present disclosure. FIG. 3 is a schematic diagram illustrating a side view of the portion of the instrument panel 100 of a vehicle including the airbag system of FIG. 2 for restraining the lower body of a vehicle occupant 15 in a second configuration during a collision event, according to various embodiments of the present disclosure.

As discussed above, the airbag system 120 includes a panel 110 and a restraining airbag 121. The panel 110 defines a support surface 112 that is adapted to be deployed from a first configuration, as shown in FIG. 2, to a second configuration, as shown in FIG. 3, responsive to the collision event. As shown in FIG. 2, in the first configuration, the panel 110 forms part of an instrument panel 100 of a vehicle. In embodiments, the panel 110 is flush with the adjacent panel 104. While a gap is shown in FIG. 2 between the panel 110 and the adjacent panel 104, other configurations of the seam between the panel 110 and the adjacent panel 104 are also contemplated, such as the panel 110 and the adjacent panel 104 abutting or overlapping.

As shown in FIG. 3, in the second configuration, the panel 110 is at least partially separated from the instrument panel 100 of the vehicle. In embodiments, the panel 110 is pivotably coupled to the instrument panel 100 of the vehicle and adapted to be pivoted from the first configuration to the second configuration as illustrated in FIGS. 2 and 3. Alternatively, the panel 110 is translated or both translated and rotated from the first configuration to the second configuration.

The restraining airbag 121 is adapted to be deployed adjacent to the support surface 112 of the panel 110 between the support surface 112 and the lower body of the vehicle occupant 15 responsive to the collision event. The restraining airbag 121 comprises an inflator mechanism (the one or more ignitors/inflators 126) that is disposed one of within an area defined by the instrument panel 100 of the vehicle and adjacent to the support surface 112 of the panel 110.

The panel 110 is adapted to be deployed from the first configuration to the second configuration one of before and simultaneously with the restraining airbag 121 being deployed adjacent to the support surface 112 of the panel 110 between the support surface 112 and the lower body of the vehicle occupant 15.

In embodiments, the airbag system 120 also includes a mechanical actuator 150 coupled to the panel 110 and at least one of the instrument panel 100 of the vehicle and a frame of the vehicle. The mechanical actuator 150 is adapted to deploy the panel 110 from the first configuration to the second configuration. In the embodiment illustrated in FIGS. 2 and 3, the mechanical actuator 150 causes one or more mechanical linkages 131 to deploy the panel 110 and is coupled to the panel 110 via the one or more mechanical linkages 131. Further, in the embodiment illustrated in FIGS. 2 and 3, the mechanical actuator 150 is coupled to a hidden panel 102 within the instrument panel 100.

In embodiments, the airbag system 120 also includes a locking mechanism 132 coupled to the panel 110 and at least one of the instrument panel 100 of the vehicle and a frame of the vehicle. The locking mechanism 132 is adapted to secure the panel 110 in the second configuration once deployed. In the embodiment illustrated, the locking mechanism 132 locks two mechanical linkages 131 in an expanded configuration. The locking mechanism 132 is adapted to prevent rotation or other movement of the panel 110 once the panel 110 reaches the second configuration. Other configurations of the locking mechanism 132 are also contemplated, such as an antirotation mechanism positioned at the pivot point of the panel 110, and the like.

Figure 4:
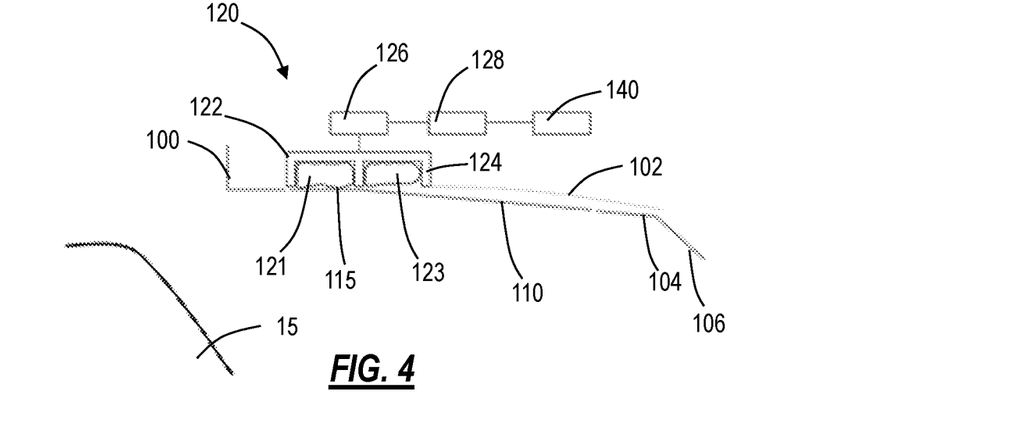
FIG. 4 is a schematic diagram illustrating a side view of a portion of the instrument panel of a vehicle including an airbag system for restraining a lower body of a vehicle occupant in a first configuration prior to a collision event, according to various embodiments of the present disclosure.
Figure 5:
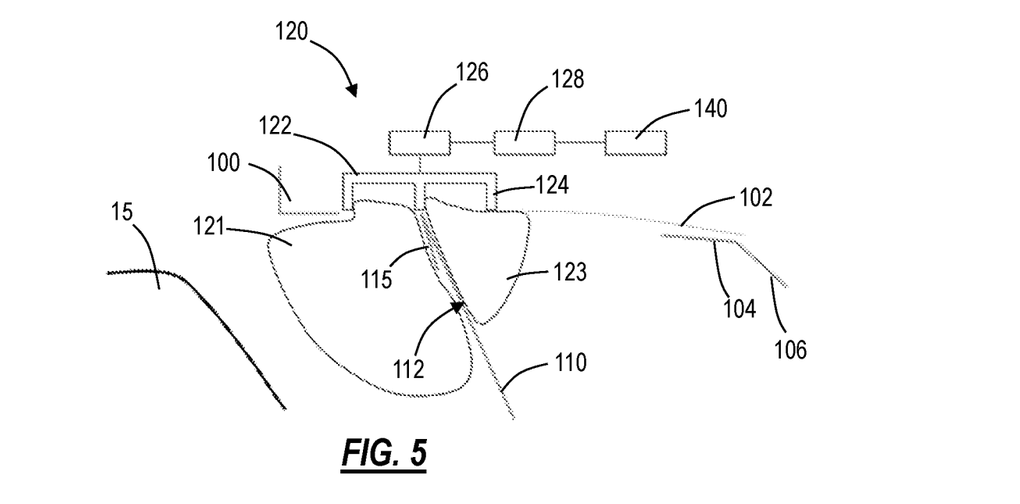
FIG. 5 is a schematic diagram illustrating a side view of a portion of the instrument panel of a vehicle including an airbag system of FIG. 4 for restraining a lower body of a vehicle occupant in a second configuration during a collision event, according to various embodiments of the present disclosure.

FIG. 4 is a schematic diagram illustrating a side view of a portion of the instrument panel 100 of a vehicle including an airbag system 120 for restraining a lower body of a vehicle occupant 15 in a first configuration prior to a collision event, according to various embodiments of the present disclosure. FIG. 5 is a schematic diagram illustrating a side view of the portion of the instrument panel 100 of the vehicle including the airbag system 120 of FIG. 4 for restraining the lower body of the vehicle occupant 15 in a second configuration during the collision event, according to various embodiments of the present disclosure.

As disclosed above, the panel 110 deploys from the first configuration where the panel 110 forms part of an instrument panel 100 of a vehicle to the second configuration where the panel 110 is at least partially separated from the instrument panel 100 of the vehicle to provide support for the restraining airbag 121 via the support surface 112.

In embodiments, as shown in FIGS. 4 and 5, the airbag system 120 further includes a supporting airbag 123 adapted to be deployed between the instrument panel 100 of the vehicle and the panel 106 opposite the support surface 112 to deploy the panel 110 from the first configuration to the second configuration. The supporting airbag 123 is adapted to hold the panel 110 in place during the collision event to ensure the support surface 112 supports the restraining airbag 121 during the collision event.

In embodiments, the airbag system 120 also includes a supporting airbag storage module 124. The supporting airbag storage module 124 is positioned within the instrument panel 100 adjacent to the panel 110, such as above the panel 110, and holds the supporting airbag 124 in an uninflated state prior to deployment of the supporting airbag 124. In the embodiment shown in FIG. 5, the supporting airbag 124 deploys downward from the instrument panel 100 and is supported by one or more surfaces of the instrument panel 100, such as the hidden panel 102, the panel 106 opposite the support surface 112, and the other panel 104. In embodiments, the supporting airbag storage module 124 also supports the supporting airbag 123.

Figure 6:
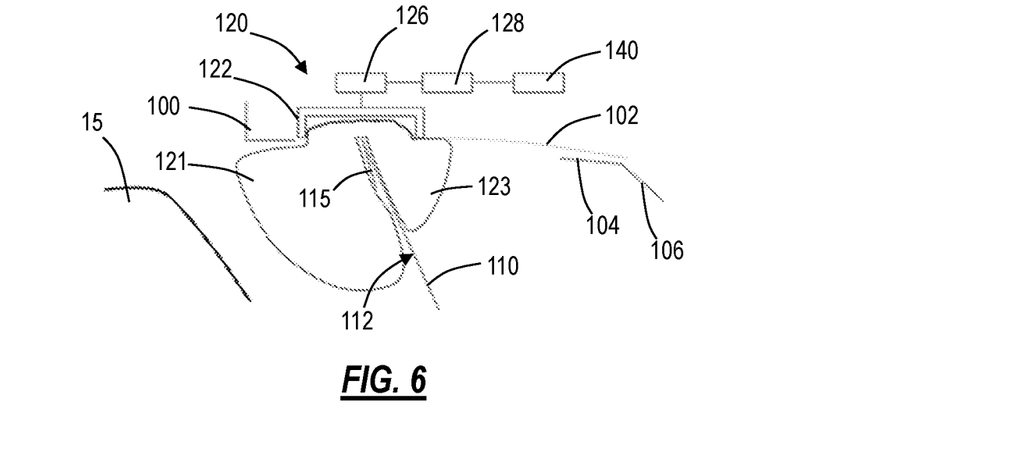
FIG. 6 is a schematic diagram illustrating a side view of a portion of the instrument panel of a vehicle including an airbag system for restraining a lower body of a vehicle occupant in a second configuration during a collision event, according to various embodiments of the present disclosure.

FIG. 6 is a schematic diagram illustrating a side view of a portion of the instrument panel 100 of a vehicle including an airbag system 120 for restraining a lower body of a vehicle occupant 15 in a second configuration during a collision event, according to various embodiments of the present disclosure. As shown in FIG. 6, in some embodiments, the restraining airbag 121 and the supporting airbag 123 form different chambers of a common airbag.

The restraining airbag storage module 122 holds the common airbag, and upon detection of a collision event, the chamber of the restraining airbag 121 deploys downward between the lower body of the vehicle occupant 15 adjacent to the supporting surface 112, while the chamber of the supporting airbag 123 deploys on an opposite sideof the panel 110. The deployment of the common airbag causes both the panel 110 and the cover panel 115 to pivot simultaneously.

Figure 7:
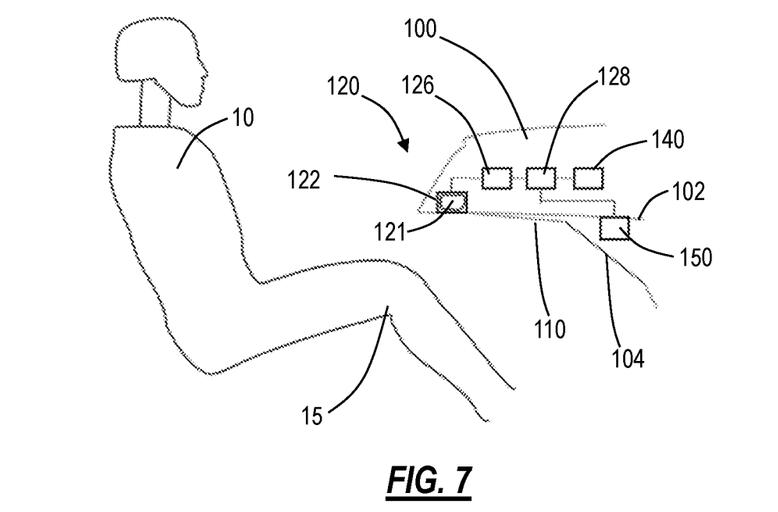
FIG. 7 is a schematic diagram illustrating a side view of an interior portion of a vehicle including an instrument panel and an airbag system for restraining a lower body of a vehicle occupant in a first configuration prior to a collision event, according to various embodiments of the present disclosure.
Figure 8:
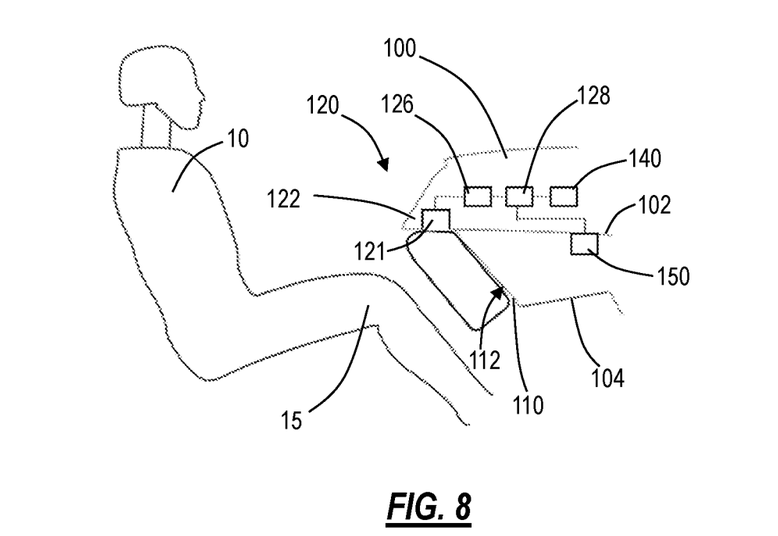
FIG. 8 is a schematic diagram illustrating a side view of an interior portion of a vehicle including an instrument panel and an airbag system of FIG. 7 for restraining a lower body of a vehicle occupant in a second configuration during a collision event, according to various embodiments of the present disclosure.

FIG. 7 is a schematic diagram illustrating a side view of an interior portion of a vehicle including an instrument panel 100 and an airbag system 100 for restraining a lower body of a vehicle occupant 15 in a first configuration prior to a collision event, according to various embodiments of the present disclosure. FIG. 8 is a schematic diagram illustrating a side view of the interior portion of the vehicle including the instrument panel 100 and the airbag system 120 of FIG. 7 for restraining a lower body of a vehicle occupant 15 in the second configuration during a collision event, according to various embodiments of the present disclosure.

As disclosed above, the panel 110 deploys from the first configuration where the panel 110 forms part of an instrument panel 100 of a vehicle to the second configuration where the panel 110 is at least partially separated from the instrument panel 100 of the vehicle to provide support for the restraining airbag 121 via the support surface 112.

In embodiments, as shown in FIGS. 7 and 8, another panel 104 deploys with the panel 110. The other panel 104 is adapted to lock into place behind the panel 110 and hold the panel 110 in the second configuration during the collision event. An end of the other panel 104 is coupled to the end of the panel 110 opposite the pivot point of the panel 110. The other panel 104 is also adapted to pivot from the end distal to the panel 110. The coupled ends of the panel 110 and the other panel 104 are adapted to lock when the panel 110 reaches the second configuration. Optionally, the actuator 150 is coupled to one of the panel 110 and the other panel 104 to actuate the panel 110 from the first configuration to the second configuration.

Figure 9:
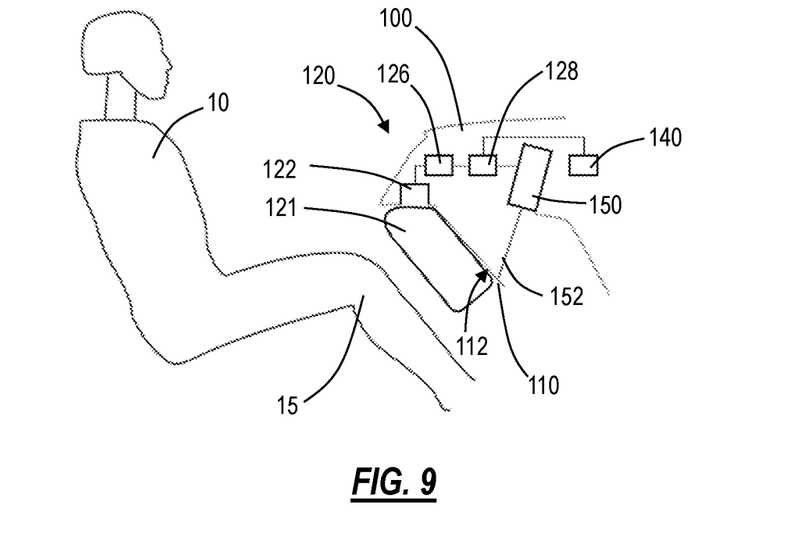
FIG. 9 is a schematic diagram illustrating a side view of an interior portion of a vehicle including an instrument panel and an airbag system for restraining a lower body of a vehicle occupant in a first configuration prior to a collision event, according to various embodiments of the present disclosure.

FIG. 9 is a schematic diagram illustrating a side view of an interior portion of a vehicle including an instrument panel 100 and an airbag system 120 for restraining a lower body of a vehicle occupant 15 in a second configuration during a collision event, according to various embodiments of the present disclosure. In the embodiment shown in FIG. 9, the actuator 150 includes an actuation arm 152 connected directly to the panel 110 for actuating the panel 110 from the first configuration to the second configuration. In embodiments, the actuator 150 is one of a compressed spring that is released, a pneumatic actuator, a hydraulic actuator, and a motor driven actuator.

Figure 10:
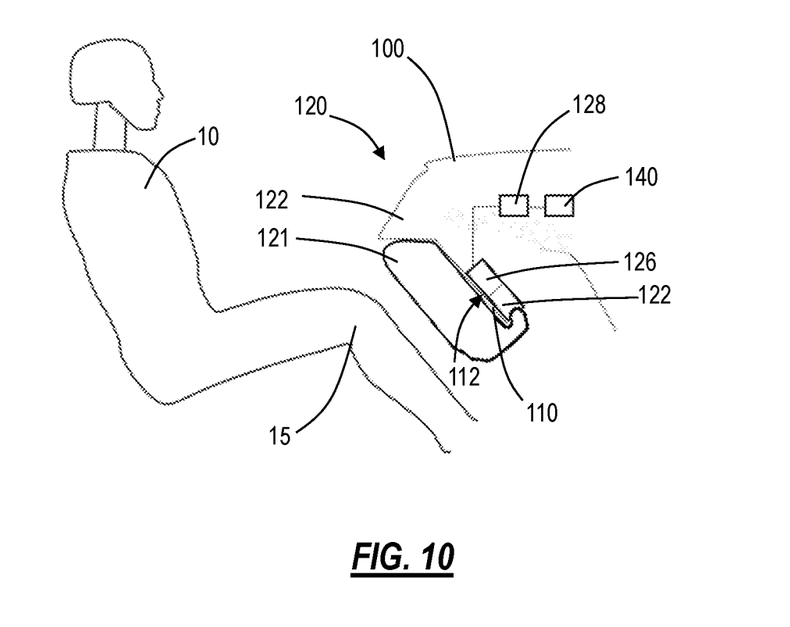
FIG. 10 is a schematic diagram illustrating a side view of an interior portion of a vehicle including an instrument panel and an airbag system of FIG. 9 for restraining a lower body of a vehicle occupant in a second configuration during a collision event, according to various embodiments of the present disclosure.

FIG. 10 is a schematic diagram illustrating a side view of an interior portion of a vehicle including an instrument panel 100 and an airbag system 120 for restraining a lower body of a vehicle occupant 15 in a second configuration during a collision event, according to various embodiments of the present disclosure.

Referring to FIG. 10, in embodiments, the restraining airbag storage module 122 and the one or more inflators 126 are positioned on a backside of the panel 110 opposite the support surface 112. The restraining airbag 121 deploys from the backside of the panel 110 around an end of the panel 110 and inbetween the support surface 112 and the lower body of the vehicle occupant 15 adjacent to the support surface 112.

Figure 11:
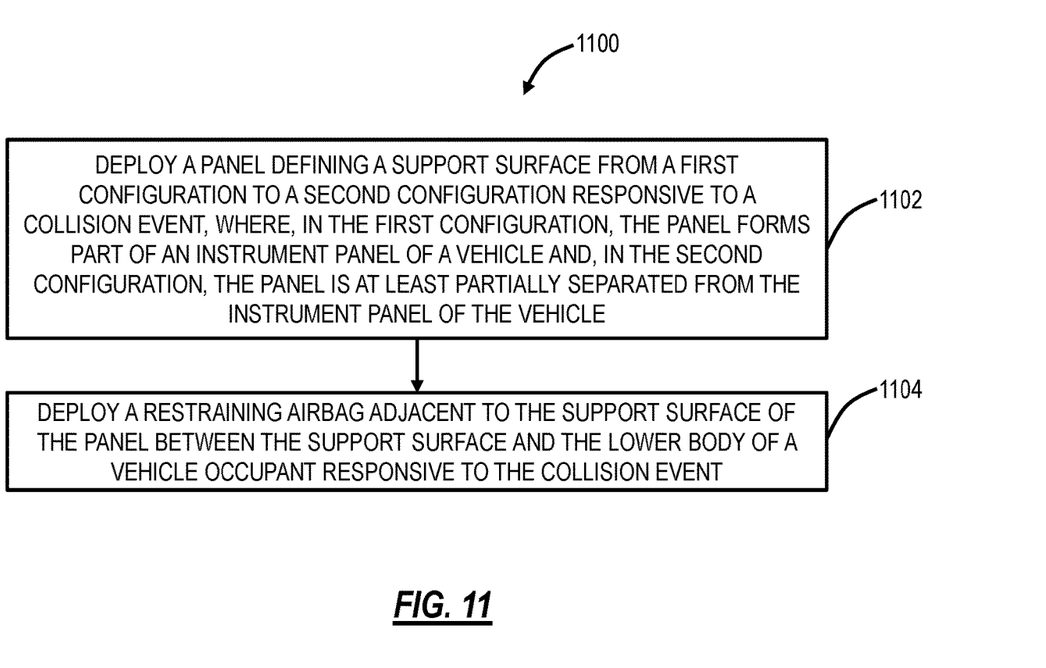
FIG. 11 is a flowchart of a method for deploying an airbag system for restraining a lower body of a vehicle occupant during a collision event.

FIG. 11 is a flowchart of a method 1100 for deploying an airbag system 120 for restraining a lower body of a vehicle occupant 15 during a collision event. The method 1100 includes deploying a panel 110 defining a support surface 112 from a first configuration to a second configuration responsive to the collision event at step 1102. In the first configuration, the panel 110 forms part of an instrument panel 100 of a vehicle and, in the second configuration, the panel 110 is at least partially separated from the instrument panel 100 of the vehicle. The method also includes deploying a restraining airbag 121 adjacent to the support surface 112 of the panel 110 between the support surface 112 and the lower body of the vehicle occupant 15 responsive to the collision event.

In some embodiments, the panel 110 is deployed from the first configuration to the second configuration one of before and simultaneous with the restraining airbag 121 being deployed adjacent to the support surface 112 of the panel 110 between the support surface 112 and the lower body of the vehicle occupant 15.

In some embodiments, the method further includes at least one of: deploying a supporting airbag 123 between the instrument panel 100 of the vehicle and the panel 110 opposite the support surface 112 to deploy the panel 110 from the first configuration to the second configuration; and actuating the panel 110 to deploy the panel 110 from the first configuration to the second configuration using a mechanical actuator 150 coupled to the panel 110 and at least one of a component of the instrument panel 100 of the vehicle and a frame of the vehicle. The supporting airbag 123 is one of the configurations of the supporting airbag 123 disclosed herein, and the mechanical actuator 150 is one of the configurations of the mechanical actuator 150 disclosed herein.

In some embodiments, the method further includes securing the panel 110 in the second configuration once deployed via a locking mechanism 132 coupled to the panel 110 and at least one of the instrument panel 100 of the vehicle and a frame of the vehicle.

In embodiments, the method is implemented by the microprocessor 128 that executes instructions stored in a memory, which causes the airbag system 120 to deploy when a collision event is detected by the collision detector 140.

As described in detail above, the airbag system 120 deploys a support surface 112 of a panel 110 and deploys a restraining airbag 121 between the support surface 112 and a lower body of the vehicle occupant 15.

The support surface 112 provides a rigid support for the deployed restraining airbag 121, such that the deployed restraining airbag 121 is situated close to the lower body of the vehicle occupant 15 for early restraining of the lower body of the vehicle occupant during the collision event. By deploying the restraining airbag 121 with a support surface 112 behind it, the restraining airbag 121 is more compact and has a smaller cushion size and smaller inflators than would be required in other configurations. Thus, the configuration of the airbag system 120 avoids any complexities and challenges caused by the use of larger cushion sizes and inflators.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An airbag system, comprising:
   a panel defining a support surface that is adapted to be deployed from a first configuration to a second configuration responsive to a collision event, wherein, in the first configuration, the panel forms part of an instrument panel of a vehicle and, in the second configuration, the panel is at least partially separated from the instrument panel of the vehicle;
   a restraining airbag adapted to be deployed adjacent to the support surface of the panel between the support surface and a lower body of a vehicle occupant responsive to the collision event; and
   a locking mechanism comprising a pair of mechanical linkages coupled to the panel, the locking mechanism adapted to secure the panel in the second configuration when the pair of mechanical linkages are deployed from a collapsed configuration disposed next to each other to an expanded configuration disposed in line with each other.

2. The airbag system of claim 1, wherein the panel is adapted to be deployed from the first configuration to the second configuration before or simultaneous with the restraining airbag being deployed adjacent to the support surface of the panel between the support surface and the lower body of the vehicle occupant.

3. The airbag system of claim 1, wherein the panel is pivotably coupled to the instrument panel of the vehicle and adapted to be pivoted from the first configuration to the second configuration.

4. The airbag system of claim 1, wherein the restraining airbag comprises an inflator mechanism that is disposed within an area defined by the instrument panel of the vehicle or adjacent to the support surface of the panel.

5. The airbag system of claim 1, further comprising a mechanical actuator coupled to the panel, the mechanical actuator adapted to deploy the panel from the first configuration to the second configuration.

6. The airbag system of claim 1, further comprising a cover panel through which the restraining airbag is deployed, wherein the cover panel is pivotably coupled to the instrument panel adjacent to the panel defining the support surface and pivots towards the panel during deployment of the restraining airbag.

7. An instrument panel, comprising:
   a panel defining a support surface that is adapted to be deployed from a first configuration to a second configuration responsive to a collision event, wherein, in the first configuration, the panel forms part of the instrument panel of a vehicle and, in the second configuration, the panel is at least partially separated from the instrument panel of the vehicle;
   a restraining airbag adapted to be deployed adjacent to the support surface of the panel between the support surface and a lower body of a vehicle occupant responsive to the collision event; and
   a locking mechanism comprising a pair of mechanical linkages coupled to the panel, the locking mechanism adapted to secure the panel in the second configuration when the pair of mechanical linkages are deployed from a collapsed configuration disposed next to each other to an expanded configuration disposed in line with each other.

8. The instrument panel of claim 7, wherein the panel is adapted to be deployed from the first configuration to the second configuration before or simultaneous with the restraining airbag being deployed adjacent to the support surface of the panel between the support surface and the lower body of the vehicle occupant.

9. The instrument panel of claim 7, wherein the panel is pivotably coupled to a component of the instrument panel and adapted to be pivoted from the first configuration to the second configuration.

10. The instrument panel of claim 7, wherein the restraining airbag comprises an inflator mechanism that is disposed within an area defined by the instrument panel or adjacent to the support surface of the panel.

11. The instrument panel of claim 7, further comprising a mechanical actuator coupled to the panel, the mechanical actuator adapted to deploy the panel from the first configuration to the second configuration.

12. The instrument panel of claim 7, further comprising a cover panel through which the restraining airbag is deployed, wherein the cover panel is pivotably coupled to the instrument panel adjacent to the panel defining the support surface and pivots towards the panel during deployment of the restraining airbag.

13. A method for deploying an airbag system, the method comprising:
   deploying a panel defining a support surface from a first configuration to a second configuration responsive to a collision event, wherein, in the first configuration, the panel forms part of an instrument panel of a vehicle and, in the second configuration, the panel is at least partially separated from the instrument panel of the vehicle;
   deploying a restraining airbag adjacent to the support surface of the panel between the support surface and a lower body of a vehicle occupant responsive to the collision event; and
   securing the panel in the second configuration once deployed via a locking mechanism comprising a pair of mechanical linkages coupled to the panel, wherein the locking mechanism is adapted to secure the panel in the second configuration when the pair of mechanical linkages are deployed from a collapsed configuration disposed next to each other to an expanded configuration disposed in line with each other.

14. The method of claim 13, wherein the panel is deployed from the first configuration to the second configuration before or simultaneous with the restraining airbag being deployed adjacent to the support surface of the panel between the support surface and the lower body of the vehicle occupant.

15. The method of claim 13, further comprising at least one of:
   deploying a supporting airbag between the instrument panel of the vehicle and the panel opposite the support surface to deploy the panel from the first configuration to the second configuration; and
   actuating the panel to deploy the panel from the first configuration to the second configuration using a mechanical actuator coupled to the panel.

16. The method of claim 13, further comprising pivotably deploying a cover panel through which the restraining airbag is deployed during deployment of the restraining airbag, wherein the cover panel is pivotably coupled to the instrument panel adjacent to the panel defining the support surface and pivots towards the panel during deployment of the restraining airbag.

\* \* \* \* \*